June 30, 1925.  1,544,092
M. G. HUBBARD
TREE FELLING APPARATUS
Original Filed July 23, 1921   2 Sheets-Sheet 1
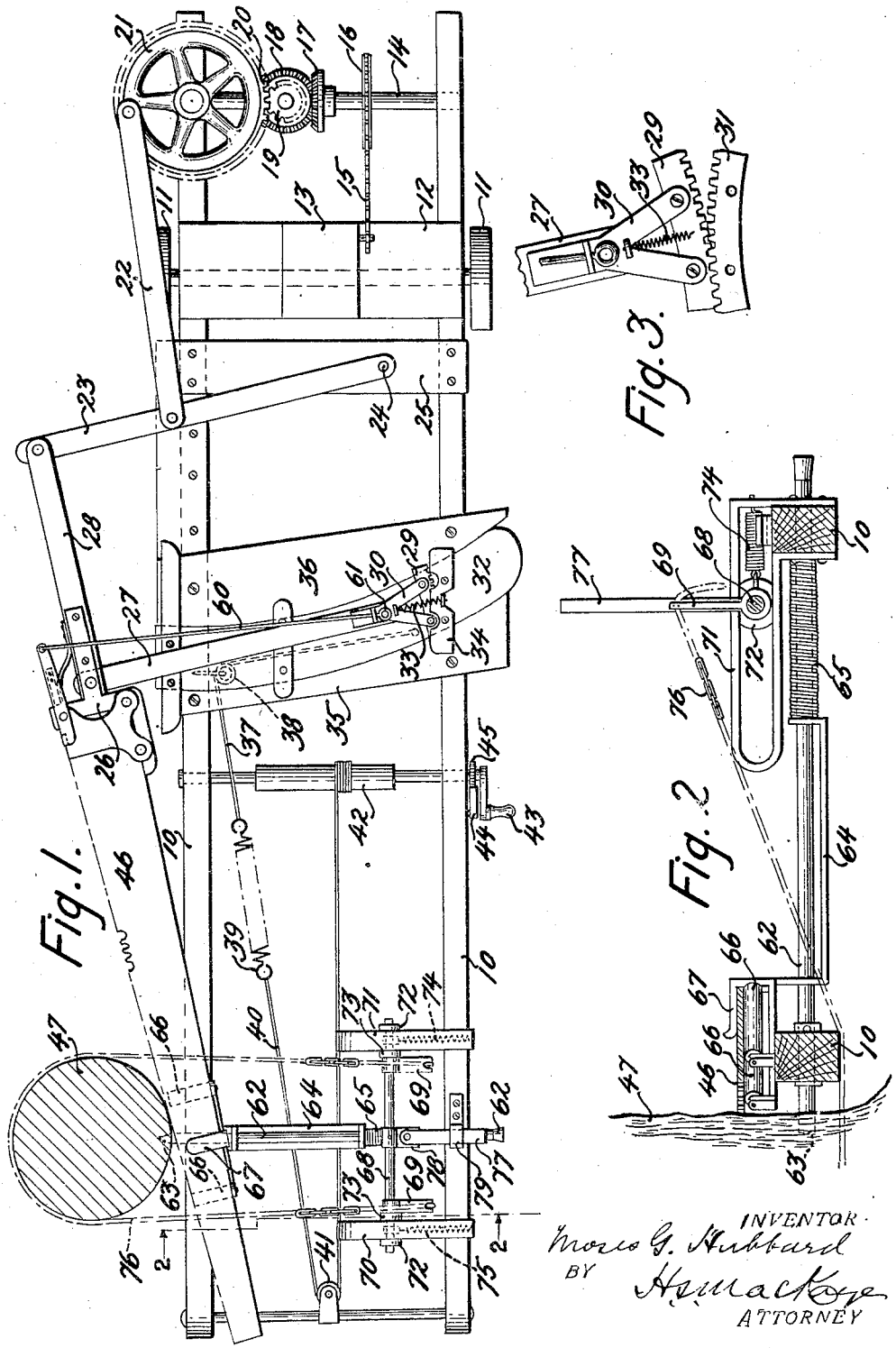
INVENTOR
Moses G. Hubbard
BY
H. MacKaye
ATTORNEY June 30, 1925.
M. G. HUBBARD
TREE FELLING APPARATUS
Original Filed July 23, 1921   2 Sheets-Sheet 2
1,544,092
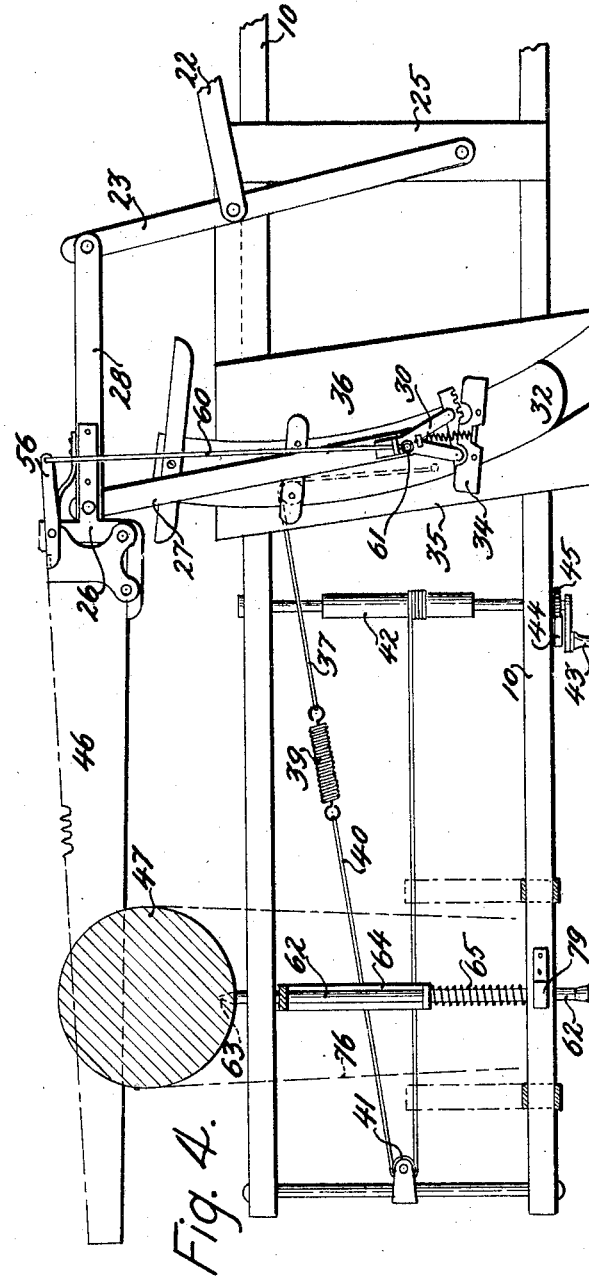
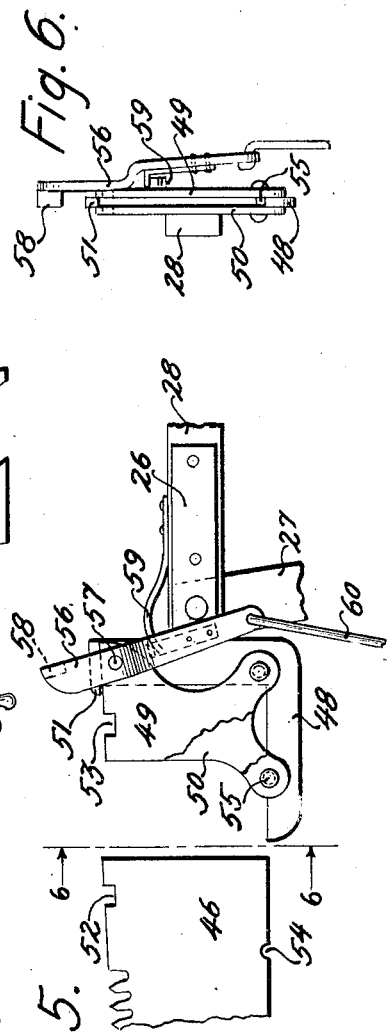
Moses G. Hubbard
INVENTOR
BY Hsmack
ATTORNEY Patented June 30, 1925.

1,544,092

UNITED STATES PATENT OFFICE.

MOSES G. HUBBARD, OF CHATHAM, NEW JERSEY, ASSIGNOR TO EXCELSIOR TREE FELLING SAW CO., INC., A CORPORATION OF NEW YORK.

TREE-FELLING APPARATUS.

Application filed July 23, 1921, Serial No. 487,022. Renewed December 5, 1924.

*To all whom it may concern:*

Be it known that I, MOSES G. HUBBARD, a citizen of the United States, residing in Chatham, county of Morris, State of New Jersey, have invented a certain Improvement in Tree-Felling Apparatus, of which the following is a specification.

In felling a tree by means of a saw, if the saw is moved in a substantially straight line, it is obvious that the resistance to the cutting action of the teeth will always be due to contact along the whole length of the bottom of the cut. Hence it will increase very rapidly in proportion as the saw enters the tree, finally attaining a maximum when the center is reached. On the other hand, if the saw be rocked so as to form a cut whose bottom is a convex circular arc, only a few teeth are in contact with the wood at a given moment, and this number remains substantially constant from beginning to end of the felling operation. The result is that the resistance to movement of the teeth is substantially constant, and is alway very much less than it is where the movement of the saw is rectilinear.

My present invention has for one of its principal objects the provision of a felling power saw so constructed as to produce a large divergence from the straight line movement, so that the bottom of the cut is an arc of relatively short radius.

Another important and novel advantage of my invention is the provision of a machine affording a powerful and effective resilient feeding pressure. The feeding pressure can be adjusted instantaneously without stopping the saw.

Another important feature of my novel improvement is the provision of means for rapidly and firmly attaching the machine to a tree, which means permit almost instantaneous disengagement and removal; so that, when the tree falls, it will not endanger either the machine or the operator. The invention also includes such a construction as will insure, whenever desired, a certain and rapid disengagement of the saw blade from the socket by which it is operated.

Other objects and advantages of the invention will more fully appear hereinafter.

A preferred embodiment of the invention is illustrated in the accompanying drawings, wherein Figure 1 is a plan view of a complete machine, Figure 2 is a vertical sectional view of a portion thereof taken on the line 2—2 in Figure 1, Figure 3 is a plan view of a detail enlarged, Figure 4 is a slightly modified plan view of a part of the machine in the position assumed when a tree is nearly cut through, Figure 5 is an enlarged view in plan of the attachment of the saw blade and Figure 6 is an elevation of the same as viewed from the line 6—6 in Figure 5.

The framework 10 is supported in any convenient manner, the support preferably including a pair of wheels 11, near one end. Immediately over these wheels is shown a cross piece 12, which carries a driving motor of any convenient character, indicated at 13. This motor may be a gasoline engine, but its details are immaterial and have not been illustrated.

The motor 13 drives a shaft 14 by means of a chain 15 and a sprocket wheel 16. By means of a train of gears 17, 18, 19 and 20, the shaft 14 imparts rotation to a wheel 21, to which is pivotally secured one end of a pitman 22. The opposite end of this pitman is pivotally secured to a driving lever 23, attached by a pivot 24 to a cross piece 25.

The socket 26 to which the saw is secured is pivoted to the end of a rocking lever 27, while a rigidly fixed extension 28 is pivoted to the end of the driving lever 23.

In order to impart a rocking movement to the saw, the inner end of the lever 27 is fixed to an arc-shaped toothed rack 29, by means of the forked plate 30, and this rack engages and rocks upon a similar toothed arc-shaped rack 31, fixed to a movable support 32. The racks 29 and 31 are held in firm engagement by a spring 33 fixed to the guard plate 34, also fixed to the support 32.

The support 32 is preferably formed in the arc of a circle struck around the axis of the wheel 21, and it is supported so as to slide between guides 35 and 36, fixed to the framework 10. One end of a cord or chain 37 is fixed to the support 32, whence it passes over a fixed pulley 38 to one end of a coiled spring 39. In Figure 1 this pulley is shown under the support 32, spiked to a stringer of the frame. From the opposite end of this spring a cord or chain 40 passes over a pulley 41 fixed to the framework, and thence around a revoluble drum 42 furnished with a crank handle 43. By this means a spring tension is exerted tending to press the support 32 outward (upward in Figure 1) and this tension can be regulated by turning the handle 43. The pawl 44 and ratchet 45 prevent unwinding of the cord on the drum.

The saw blade 46 is shown in Figure 1 just about to attack the tree indicated at 47, while in Figure 4 it is shown almost through the same. Figure 4 also shows the altered position of the support 32 when the tree is almost felled. It will, of course, be understood that the spring 39 acts during the entire felling operation, through the support 32 and lever 27, to impart effective feeding pressure upon the saw blade.

In order that the saw blade may be quickly disengaged from the socket 26, so as to free the rest of the machine from the tree at the moment of felling, a special mode of temporary attachment must be employed. The preferred means for this end are shown in Figures 4 to 6.

As plainly shown in Figure 5, the socket 26 is provided with a supporting extension 48, which forms a right angled recess adapted to receive the base of the saw blade; which is confined laterally by the cheek plates 49 and 50. The top corner of the saw blade fits under the ledge 51. The upper edge of the saw base is furnished with a rectangular notch 52 which registers with similar notches 53 in the cheek plates, while a notch 54 under the saw fits over a pin 55 at the bottom of the socket.

To fix the saw in the socket, the base is introduced between the cheek plates, the notch 54 being brought over the pin 55, and the notches 52 and 53 being brought into registry. In order to secure the parts in this position, the locking lever 56 is provided. This is pivoted to the socket at 57 and carries a projection 58 which is normally held in engagement with the notches 52 and 53 by a strong spring 59. In order that the saw may be more conveniently unlocked by the operator standing near the handle 43, a wire or cord 60 extends back from the tail of the lever 56 to a finger ring 61 within easy reach of the operator.

The means for supporting and guiding the forward end of the saw until it enters the tree are shown in Figures 1 and 2. This device preferably includes means for pressing the forward end of the saw against the tree, to promote penetration, and it is also preferred to utilize in this connection the spike by which the entire apparatus is fixed with relation to the tree. This spike 62 extends entirely across the framework, to which it is made fast. It has a sharp wedge shaped end 63, with a vertical edge, which is driven into the base of the tree by a blow of a sledge hammer on the opposite end of the spike. This holds the framework against movements in the direction of movement of the saw.

The presser-guide for the forward end of the saw comprises a metal frame 64 slidably mounted upon the spike 62 and pressed constantly forward by the spring 65, coiled around the spike. This frame carries two or more rollers 66, by which the saw blade is supported before entering the tree; as well as a confining plate 67, which fits over the upper surface of the blade and insures its steady reciprocation in a single plane.

In apparatus of this kind it is desirable to provide firm and efficient means for attaching the device to the tree to be felled, and so to construct the same that the entire apparatus may be quickly disengaged and removed when the tree starts to fall.

For this purpose, in addition to the spike 62, there is provided a cord or chain and tightener therefor, the latter being mounted upon the frame-work 10 and being preferably arranged to exert a strong spring action upon the cord or chain that surrounds the tree. In the embodiment shown in the drawings, the tightener takes the form of a shaft 68 provided with arms 69 adapted to engage the cord or chain, which shaft has its ends slidably mounted in guides 70, 71, in which it is held against longitudinal movement by shoulders 72, 73. Springs 74, 75 exert a constant pull away from the tree on the two ends of the shaft. In the form shown, the arms 69 are notched at their ends, and, when in upright position, the chain 76 is passed around the tree and, being drawn tight, its ends are dropped into these notches so that a link of each end is caught.

The shaft 68 is then revolved clockwise in Figure 2, by means of the handle 77, which is pivotally attached to a strap 78, fixed to the shaft 68. This arrangement makes it possible to secure the handle 77 in a horizontal position by sliding it under the locking bar 79 on the framework. This brings the arms 69 down, extending the springs 74 and 75, thereby tightening the chain around the tree and holding the whole apparatus firmly fixed.

With the parts in the position shown in Figure 1, the engine may be started, when the saw blade will be caused to reciprocate with a rocking movement, whereby the entire force is concentrated at all times upon relatively few teeth. This greatly increases the effectiveness of the saw. The initial pressure is provided by both feeding springs 39 and 65; but, when the blade is sufficiently advanced in the tree, the former will alone be active, as the saw will have left the guide, and the frame 64 will impinge upon the inner surface of one of the framework stringers 10. Experience has shown that a cutting speed of from five to ten inches a minute can be achieved in hard wood by a saw of this kind, using an ordinary motorcycle gas engine at 13.

When the tree is about to fall (see Figure 4) the machine must be very quickly removed to prevent injury from the kick back of the tree butt. For this purpose it is only necessary to strike the handle 77 to the left in Figure 1 and to pull the wire 60. The former movement will cause the arms 69 to fly up, throwing off the ends of the chain 76, while pulling on 60 will instantly release the saw blade. The operator can then swing the frame out of the way and wheel it out of range in a few moments. The saw blade will necessarily be left behind, but this is in no danger from the fall of the tree.

The particular mechanical movement employed, in the form shown, for imparting a rocking movement to the saw blade is not essential to the broad invention and indeed many changes may be made in this device, of a more or less radical nature, without departing from the scope of this invention, it not being intended to limit the invention to the details herein shown and described.

What is claimed is—

1. Tree-felling apparatus comprising a frame, a saw supported thereby, a slide mounted to move across the frame, a rigid lever pivotally connected with the saw and mounted on said slide so as to rock across the same during operation, a spring attached to said slide adapted to move the same forward during operation, and a motor on said frame adapted to reciprocate the saw.

2. Apparatus as in claim 1 wherein the rocking lever is provided with a curved toothed rack adapted to rock on a similar rack on the slide.

3. Tree felling apparatus comprising a frame adapted to be brought into a horizontal position with one side of one end against a tree, a band adapted to surround the tree and attachable to said frame, a spike projecting from the side of the frame for insertion in the tree, a saw on said frame adapted to swing horizontally away from the frame during operation, a motor on the frame adapted to reciprocate the saw, and feeding means for the saw.

4. Tree felling apparatus comprising a frame adapted to be brought into a horizontal position with one side of one end against a tree, a band adapted to surround the tree, elastic attaching means for said band mounted upon said frame, a saw on said frame adapted to swing horizontally away from the frame during operation, a motor on the frame adapted to reciprocate the saw, and feeding means for the saw.

5. Tree felling apparatus comprising a frame adapted to be brought into a horizontal position with one side of one end against a tree, a band adapted to surround the tree adapted to secure the frame to the tree by tension in the line of pressure of the saw, a saw on the frame adapted to make effective contact with the tree between the sides of said band, a motor on the frame for reciprocating the saw, and feeding means for the saw.

6. Tree felling apparatus comprising a frame removable by a single motion, means releasable by a single motion for attaching the frame to a tree, a saw, driving means therefor on the frame, and connecting means between the saw and the driving means releasable by a single motion so as to leave the saw behind as the tree falls and the frame is removed.

7. Apparatus as in claim 6 wherein the saw disconnecting means is supplied with an operating device extending across the frame to facilitate operation from the side of the frame away from the tree.

8. Apparatus as in claim 6 in combination with frame releasing means and saw releasing means both within reach of a single operator on the side of the frame away from the tree.

In testimony whereof I have hereto set my hand on this 21st day of July 1921.

M. G. HUBBARD.